V. R. KOONTZ.
LIFTING JACK.
APPLICATION FILED FEB. 10, 1920.
1,368,733.
Patented Feb. 15, 1921.
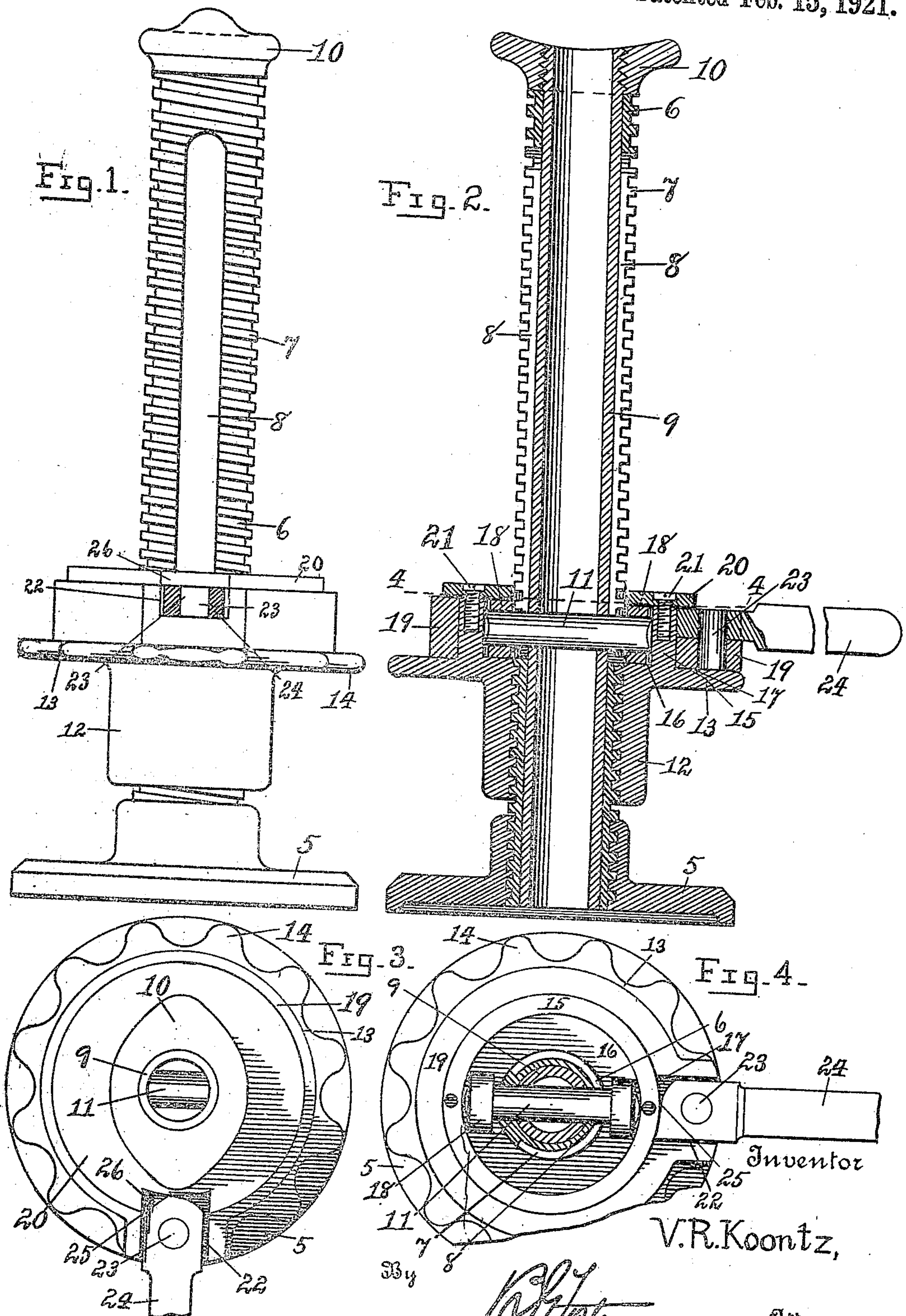

UNITED STATES PATENT OFFICE.

VICTOR R. KOONTZ, OF WAYNESBORO, PENNSYLVANIA.

LIFTING-JACK.

1,368,733. Specification of Letters Patent. Patented Feb. 15, 1921.

Application filed February 10, 1920. Serial No. 357,762.

*To all whom it may concern:*

Be it known that I, VICTOR R. KOONTZ, a citizen of the United States, residing at Waynesboro, in the county of Franklin and State of Pennsylvania, have invented certain new and useful Improvements in Lifting-Jacks, of which the following is a specification.

The present invention relates to lifting jacks, particularly of the screw type, and the object is to provide a structure that is relatively simple and very rigid and one that is not liable to become inoperative.

The preferred construction is illustrated in the accompanying drawings, wherein:—

Figure 1 is a side elevation of the jack,

Fig. 2 is a vertical longitudinal sectional view therethrough,

Fig. 3 is a plan view,

Fig. 4 is a cross sectional view substantially on the line 4—4 of Fig. 2.

Similar reference numerals designate corresponding parts in all the figures of the drawings.

In the embodiment illustrated, a base 5 is employed, to which is fixed a stationary tubular standard member 6, having external threads 7 and provided with opposite longitudinal slots 8.

Slidably mounted within the standard member 6 is a stem member 9 that is also tubular, said member having a head 10 on its upper end. The stem member is furthermore provided between its ends with a cross pin 11, the ends of which project through the slots 8, as shown in Figs. 2 and 4.

Adjustably threaded on the exterior of the standard member 6 is a nut 12 having an outstanding head portion 13, the periphery of which is corrugated or roughened, as illustrated at 14, to provide a hand grip. This head portion is also provided with an upstanding annular flange 15, providing an internal guideway 16 and an external guideway 17. The ends of the cross pin 11 project into the internal guideway 16, and have journaled thereon rollers 18 that bear upon the bottom of said guideway. A ring 19 is rotatable on the external guideway. The parts are held in place by a cap plate 20 extending over both guideways 16 and 17, and held in place by screws 21, or other suitable fasteners engaging the flange 15. The ring 19, on one side, is cut away, as indicated at 22, and carries an upstanding pivot pin 23 projecting into the cut-away portion. On this pivot pin is detachably mounted a handle lever 24, the inner end of which is in the form of a cam 25 adapted to operate against the periphery of the flange 15. A portion of the cap plate 20 is cut away, as illustrated at 26 to permit the removal of the pivoted end of the lever 24, as will be clear by reference to Fig. 3.

With this construction, it will be noted that if the nut 12 is rotated in one direction or the other, it will move up or down on the standard member 6, thereby longitudinally moving the stem member 9 in said standard member. The stem member, however, is held against rotation by reason of the pin 11 operating in the slots 8, and the frictional bearing between the pin and the nut is of course reduced by the rollers 18. Where the resistance to the movement is relatively light, the nut can be turned by the hand grip 14, or if the load is heavy, the lever 24 can be applied and coöperating with the ring 19, will grip the flange 15 of the nut, effecting a powerful step-by-step turning action. This rotation can be effected in either direction accordingly as the handle lever 24 is placed upon the pivot pin. When the handle lever is detached it can, if desired, be placed within the hollow stem member 9, affording a compact arrangement for packing and transportation purposes.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In a lifting jack, a tubular standard, a supporting stem slidably mounted in the standard and projecting from one end of the same, an elevating device movably mounted on the exterior of the standard and supported thereby, and an operating connection between the portion of the stem within the standard and the operating device, said connection extending laterally through the wall of the standard and being movable therein.

2. In a lifting jack, a tubular standard, a supporting stem slidably mounted in the standard and projecting from one end of the same, an elevating device movably mounted on the exterior of the standard and supported thereby, said standard having a longitudinal slot, and a device carried by the stem and slidably projecting through the slot, the projecting portion of said device being movably engaged by the elevating device.

3. In a lifting jack, the combination with an externally threaded tubular standard, of a stem slidably mounted therein, a nut adjustably threaded on the standard, and a connection between the nut and stem that permits their relative rotation while maintaining them against material relative longitudinal movement.

4. In a lifting jack, the combination with an externally threaded tubular standard having opposite longitudinal slots, of a stem slidably mounted in the standard, a mounting on the stem projecting through the slots, and an adjusting nut threaded on the standard and rotatably engaging the mounting to effect the relative movement of the standard and stem.

5. In a lifting jack, the combination with an externally threaded tubular standard having opposite longitudinal slots, of a stem slidably mounted in the standard, a cross pin on the stem projecting through the slots, an adjusting nut threaded on the standard and having a continuous bearing surface, and rollers on the pin and operating on the bearing surface.

6. In a lifting jack, the combination with a base, of an externally threaded tubular standard having opposite longitudinally disposed slots, a stem slidable in the standard and having a bearing head on its outer end, an adjusting nut threaded on the standard and having a recessed annular channel, a cross pin carried by the inner end of the stem and projecting through the slots into the channel, and bearing rollers journaled on the projecting ends of the pin and bearing against the nut.

7. In a lifting jack, an externally threaded standard member, a stem slidably mounted in the standard member and having a portion projecting therefrom, a nut adjustably threaded on the standard member and having a movable bearing with the projecting portion, a ring rotatably mounted on the nut around the said bearing, and a handle pivoted on the ring and having a cam portion that grips the nut.

8. In a lifting jack, the combination with an externally threaded standard member having a longitudinal slot, of a stem member slidably mounted in the standard and having a portion projecting through the slot, a nut adjustably threaded on the standard and having internal and external annular bearing surfaces, a roller bearing between the projecting portion of the stem and the internal bearing surface, a ring rotatably mounted on the external bearing surface, and a handle pivoted on the ring and having a cam that grips the external bearing surface.

In testimony whereof I affix my signature in the presence of two witnesses.

VICTOR R. KOONTZ.

Witnesses:
PEARL RIDENOUR,
WATSON R. DORSON.